United States Patent [19]
Van Der AA

[11] 3,748,970
[45] July 31, 1973

[54] DEVICE WITH ROLLING DIAPHRAGM SEAL SEPARATING GAS AND LIQUID

[75] Inventor: Herman Henricus Maria Van Der AA, Emmasingel, Eindhoven, Netherlands

[73] Assignee: U.S. Philips Corporation, New York, N.Y.

[22] Filed: Apr. 17, 1970

[21] Appl. No.: 33,133

Related U.S. Application Data

[62] Division of Ser. No. 621,847, March 9, 1967, Pat. No. 3,547,005.

[52] U.S. Cl. .................................................. 92/83
[51] Int. Cl. ............................................ F15b 21/04
[58] Field of Search ............... 92/83, 84, 98, 98 RD; 60/24; 91/416, 433, 437

[56] References Cited
UNITED STATES PATENTS

| | | | |
|---|---|---|---|
| 3,277,795 | 10/1966 | Rietdijk | 92/84 |
| 3,559,398 | 2/1971 | Meijer | 60/24 |
| 3,241,379 | 3/1966 | Rietdijk et al. | 92/98 R |
| 3,272,089 | 9/1966 | Rietdijk | 92/83 |
| 3,277,795 | 10/1966 | Rietdijk | 92/84 |
| 3,302,392 | 2/1967 | Fokker et al. | 92/83 X |
| 3,318,200 | 5/1967 | Rietdijk | 92/98 R |
| 3,339,464 | 9/1967 | Rietdijk | 92/98 R |
| 3,372,624 | 3/1968 | Rietdijk | 92/98 D |
| 3,492,813 | 2/1970 | Meijer | 92/83 |
| 3,559,398 | 2/1971 | Meijer et al. | 60/24 |

Primary Examiner—Martin P. Schwadron
Assistant Examiner—Abe Hershkovitz
Attorney—Frank R. Trifari

[57] ABSTRACT

This invention relates to apparatus having a rolling diaphragm seal between two coaxial elements such as a piston and cylinder, and is adaptable for use with a hot gas engine. The diaphragm has a concave side and a convex side which separate a gas space on one side thereof and a liquid space on the other. For preventing the pressure of the fluid on the concave side from becoming excessive, a control means is provided for conducting liquid into or out of the liquid space on one side of the diaphragm, to correspond with any excessive pressure differential across the diaphgram.

7 Claims, 8 Drawing Figures

DEVICE WITH ROLLING DIAPHRAGM SEAL SEPARATING GAS AND LIQUID

CROSS REFERENCE

This is a division of applicant's co-pending application Ser. No. 621,847, filed Mar. 9, 1967 now U.S. Pat. No. 3,547,005. 1967.

The invention relates to a device which comprises at least one seal constructed as a rolling diaphragm between two coaxially arranged elements movable relative to one another, which seal separates from one another a space containing a gas and a space containing at least during normal operation, a liquid, the rolling diaphragm facing the gas space with its concave or its convex side and the device comprising pumping means for supplying liquid to the liquid space in question, the device further comprising a control device for conducting away liquid from the liquid space when the pressure differential across the rolling diaphragm falls below a minimum value which may be adjustable or exceeds a maximum value which may be adjustable.

Devices of the above type are known and are formed, for example, by hot-gas reciprocating engines, compressors, and the like.

These machines comprise a rolling diaphragm seal between the piston and the cylinder in order to prevent, that on the one hand gaseous medium leaks away from the working space, and, on the other hand, contaminations, for example, lubricant, enter the working space.

In these engines the rolling diaphragm bounds a liquid space with its side remote from the working space. Liquid can be supplied to this space by pumping means, a control device ensuring that so much liquid is conducted away from the space that the pressure differential across a rolling diaphragm which faces the gas space with its concave side does not fall below a given minimum value, and that said pressure differential across a rolling diaphragm which faces the gas space with its convex side, does not exceed a given maximum value.

In these known devices it may occur that by some cause or other the pumping means supply an insufficient amount of liquid. As a result of leakage the quantity of liquid in the liquid space will decrease. This means that in the case of a concave diaphragm the pressure differential across the rolling diaphragm will increase and will become so large in the long run that the rolling diaphragm is destroyed. In the case of a convex diaphragm, on the contrary, the pressure differential will decrease as a result of which at a given instant the rolling diaphragm is no longer stretched which results in the formation of pleats so that the rolling diaphragm will be destroyed.

In the known devices the pumping means are usually coupled directly to the shaft of these devices. So when the devices are stationary, no liquid will be supplied. During the stationary period the liquid will leak away from the liquid space. When the device is started again no liquid or an insufficient amount of liquid will be present initially for supporting the rolling diaphragm. This means that when the desired operating pressure occurs immediately in the working space, the pressure differential across the rolling diaphragm will have an inadmissible value. For that reason it has so far been impossible to start the device directly with the desired operating pressure.

It is the object of the invention to provide a device having a rolling diaphragm seal of the above described type which can be started immediately at the desired operating pressure without the rolling diaphragm being loaded inadmissibly.

The device according to the invention is characterized in that the said liquid space communicates through a duct with a space containing a gas and/or a liquid, means being provided for bringing medium from the said space into the liquid space when the pressure differential across the rolling diaphragm exceeds a maximum value which may be adjustable or falls below a minimum value which may be adjustable.

If in the device according to the invention the pressure differential across the rolling diaphragm becomes too large or too small, additional medium is applied to the liquid space below the rolling diaphragm so that a good support of the rolling diaphragm is ensured at all times. As a result of this it has become possible to start said device immediately with the desired operating pressure, while in addition a safeguarding has been obtained for disturbances in the supply of liquid to the liquid space occurring during operation, so that a shortage of liquid in that space would occur and the pressure differential across the rolling diaphragm would become too large or too small. The means for supplying additional medium to the liquid space may be constituted by a pump.

In a favourable embodiment of the device according to the invention, the pressure of the medium in the said space is always higher than the pressure in the liquid space, a controllable valve being arranged in the communication duct which valve is opened when the pressure differential across the rolling diaphragm exceeds a maximum value which may be adjustable or falls below a minimum value which may be adjustable. In this case, the valve may be a spring-loaded check valve or a valve controlled by the pressure differential across the rolling diaphragm. As a result of the pressure differential, the medium automatically flows to the liquid space.

In a further embodiment of the device according to the invention, the liquid space is in open communication with the said space through the said communication duct, the said space containing a liquid under a pressure which is always substantially equal to the pressure in the gas space reduced and increased, respectively, by the desired differential pressure across the rolling diaphragm.

In a favourable embodiment of the device according to the invention, in which the rolling diaphragm faces the gas space with its concave side, the said communication duct which comprises a valve and adjoins the liquid space with its other side directly adjoins the gas space sealed by the rolling diaphragm. In this device, when the pressure differential across the rolling diaphragm exceeds a maximum value, that is to say, if insufficient liquid is present in the liquid space, a gas support is temporarily used instead of a liquid support.

A further favourable embodiment of the device according to the invention in which the rolling diaphragm faces the gas space with its concave side, is characterized in that the communication duct comprising a valve and adjoining the liquid space adjoins with its other side a further space which is entirely filled with liquid, which further space is separated from the gas space sealed by the rolling diaphragm by a freely movable wall or part of a wall. Consequently, the liquid in the further space will be under the same pressure as that which prevails in the sealed gas space. If the pressure differential across the rolling diaphragm exceeds the maximum value, the valve in the communication duct will be opened, so that liquid is forced out of the further space into the liquid space. As a result of this it is achieved again that the pressure differential across the rolling diaphragm always remains within the desired limits.

In a further favourable embodiment of the device according to the invention, in which the rolling diaphragm faces the gas space with its convex side, the said communication duct, which comprises a valve and adjoins the liquid space, adjoins with its other side a container which contains a gas and/or liquid under a pressure which is at least equal to the pressure in the sealed gas space increased by the minimum permissible differential pressure across the rolling diaphragm. When the rolling diaphragm faces the gas space with its convex side, the pressure in the liquid space will always have to be higher by a given amount than the pressure in the sealed gas space. This means that if medium is to be supplied to said space it will be necessary that said medium can be supplied under a pressure which is higher than the desired pressure in that space. In order to achieve this, according to the invention, a separate container is provided in which the desired high pressure prevails.

In order to ensure that substantially immediately after opening the valve in the said communication duct the pressure in the liquid space assumes the desired value, according to a further embodiment of the device according to the invention, the communication duct is constructed so as to have a low resistance to flow.

According to a further favourable embodiment of the device according to the invention, in which the said communication duct adjoining the liquid space adjoins with its other side a gas-filled space, the said control device is also incorporated in the communication duct. This has the advantage that the gas which is used as a temporary supporting medium will first be conducted away again from the liquid space after the pumping means are actuated.

A further embodiment of the device according to the invention is characterized in that while the said communication duct adjoining the liquid space adjoins with its other side a gas-gilled space, at least when the valve is in its open position, substantially no pressure variations occur in the gas space sealed by the rolling diaphragm. Because gas has a certain compressibility, also the gas in the liquid space will be compressed alternately more or less by pressure variations if these occur in the sealed space so that volume variations occur, as a result of which the rolling diaphragm will be expanded more or less which has adverse influences on the life of said rolling diaphragm.

A further embodiment of the device according to the invention, which comprises at least one cylinder and a piston-like body reciprocating therein and varying with its one side the volume of a working space and bounding with its other side a buffer space having such a volume that the volume variations caused by the movement of the piston produce substantially no pressure variations in that buffer space, the piston-like body being provided with a piston rod which is passed through the wall of the buffer space, a seal being arranged both between the piston-like body and the cylinder and between the piston rod and the wall of the buffer space, is characterized in that only the seal between the piston rod and the wall of the buffer space is constructed as a rolling diaphragm, the other side of the communication duct which adjoins the liquid space below the rolling diaphragm and comprises a valve opening into the buffer space. This device may be immediately started at all times with the desired working pressure in the working space and in the buffer space also if an insufficient quantity of liquid is present in the liquid space for supporting the rolling diaphragm. In that case the valve in the communication duct will be opened and the rolling diaphragm be supported temporarily by gas which is under the pressure which prevails in the buffer chamber. After some time the pumping means will have supplied a sufficient quantity of liquid, after which the rolling diaphragm is supported by liquid.

A further favourable embodiment of the device according to the invention is constructed as a hot-gas reciprocating engine of the displacer type and comprises at least one cylinder having a piston and a displacer reciprocating therein for varying the volumes of a compression space and an expansion space having different average temperatures, the spaces communicating with one another and a generator being arranged in said communication so that a working medium can flow there and back, the piston bounding with its side remote from the working space a buffer space having such a volume that the volume variations produced by the movement of the piston substantially cause no pressure variations; the piston comprising a piston rod which is passed through the wall of the buffer space and the displacer being provided with a displacer rod which is passed through the piston and the piston rod, seals being provided between the piston and the cylinder, between the piston rod and the wall of the buffer space, and between the piston and the displacer rod. This device is characterized in that the seal between the piston rod and the wall of the buffer space is constituted by a rolling diaphragm, the seal between the piston rod and the displacer rod being constituted by a non-hermetical seal and a rolling diaphragm, the space between these two seals being in open communication with the buffer space and the two liquid spaces below the rolling diaphragms being in open communication with one another, the said communication duct comprising a valve, adjoining at least one of the said liquid spaces and communicating said spaces with the buffer space. In this manner an extremely satisfactory seal of a hot-gas reciprocating engine of the displacer type is obtained which can be started immediately with the desired operating pressure without objection for the rolling diaphragms, said rolling diaphragms being temporarily supported by gas from the buffer space if an insufficient quantity of liquid is available below the rolling diaphragms. Since substantially no pressure variations occur in the buffer space, this gas support has no adverse influence for the rolling diaphragms.

After the above discription it will be clear that the invention provides an extremely simple measure for starting devices which comprise rolling diaphragm seals supported by liquid immediately at the desired operating pressures, while this measure during operation serves as a safety when interferences occur in the liquid supply to the liquid space below the rolling diaphragm so that said rolling diaphragms are not exposed to too large pressure differentials.

In order that the invention may readily be carried into effect, a few examples thereof will now be described in greater detail, by way of example, with reference to the accompanying drawings which are shown diagrammatically and not to scale.

Figure 1:
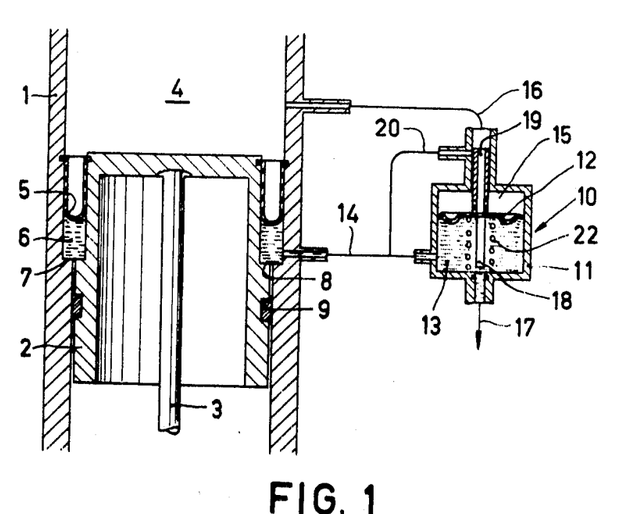
FIGS. 1, 2 and 3 diagrammatically show cross-sectional views of three embodiments of devices which comprise rolling diaphragm seals supported by liquid, the rolling diaphragms facing the sealed gas space with their concave sides.

Referring now to FIG. 1, reference numeral 1 denotes a cylinder in which a piston 2 reciprocates which is connected, through a piston rod 3, to a gear not shown. When the piston 2 moves it varies with its upper side the volume of a working space 4 containing gas. The seal between the piston 2 and the cylinder 1 is formed by rolling diaphragm 5 which, at least during normal operation, is supported by liquid contained in a liquid space 6 below the rolling diaphragm. The liquid space 6 is bounded on its upper side by the rolling diaphragm and on its lower side by the two annular surfaces 7 and 8 of equal area so that, when the piston moves, the volume of the space 6 will remain constant. The piston 2 further comprises an oil pump ring 9 which pumps lubricating oil which is on the wall of the cylinder to the space 6. To maintain a constant pressure differential across the rolling diaphragm 5, a control device 10 is provided. This device consists of a housing 11 which is divided into two parts by a diaphragm 12. The part 13 communicates with the liquid space 6 through a duct 14, while the part 15 communicates with the gas space 4 through a duct 16. A liquid outlet pipe 17 further communicates with the part 13 which duct can be closed by a valve 18 which is connected to the diaphragm 12. The diaphragm 12 furthermore comprises a sliding member 19 which is movable in the duct 16 and can close or open a duct 20 in accordance with the position of the diaphragm 12.

The operation of this device is as follows. During normal operation the oil pump ring 9 supplies oil to the liquid space 6. As a result of this the oil volume in the space 6 increases which would have for its result that the pressure differential across the rolling diaphragm 5 would decrease. The diaphragm 12 in the control device 10 is under the influence of a compression spring 22 which is adjusted so that the valve 18 opens the liquid outlet 17 when the pressure differential between the gas in the space 4 and the liquid in the space 6 has reached a given value, for example, 5 atmospheres. The oil then still applied by the pump ring 9 disappears immediately again through the oil outlet duct 17 out of the space 6. This so-called flushing of the oil in the space 6 has the advantage that gas, if any, diffused through the rolling diaphragm, disappears out of the space 6 with the dissipated oil, so that the danger does not exist that at a given instant the diffused oil exceeds the saturation concentration so that vapour bubbles would be formed which would make the support of the rolling diaphragm 5 somewhat resilient. So in this manner it is prevented that the pressure differential across the rolling diaphragm 5 becomes smaller than a minimum adjusted value.

When the device is stationary, the liquid will gradually leak away out of the space 6. If afterwards it is desirable to start the device again immediately at the desired operating pressure in the space 4, there will be no liquid available for supporting the rolling diaphragm 5 so that a very large pressure differential across the rolling diaphragm will occur. This is prevented in the device shown in FIG. 1 in that, when the pressure differential across the diaphragm 12 in the device exceeds a given value, this diaphragm is forced down through such a distance that the slide 19 opens the duct 20 so that gas from the space 4 enters the spaces 6 and 13 through the ducts 16 and 20. So in that case, the rolling diaphragm 5 is temporarily supported by gas. This has no adverse influence for the rolling diaphragm if only no or substantially no pressure variations occur in the space 4. The diaphragm will be supported and stretched in the correct manner so that in that case the device can start at the desired operating pressure in the space 4. It is desirable that the ducts 16, 20 and 14 in this device should have a small resistance to flow so that the gas from the space 4 may enter the space 6 without delay. The duct 20 opens directly near the outlet 17 so that the gas from the space 4 which has reached the space below the rolling diaphragm can disappear out of the liquid space as rapidly as possible again when liquid is supplied by the pump ring 9.

Figure 2:
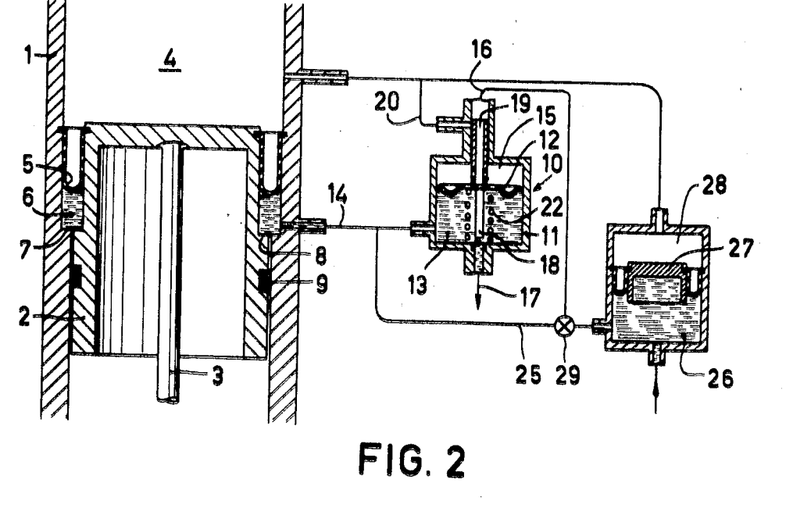
Figure 3:
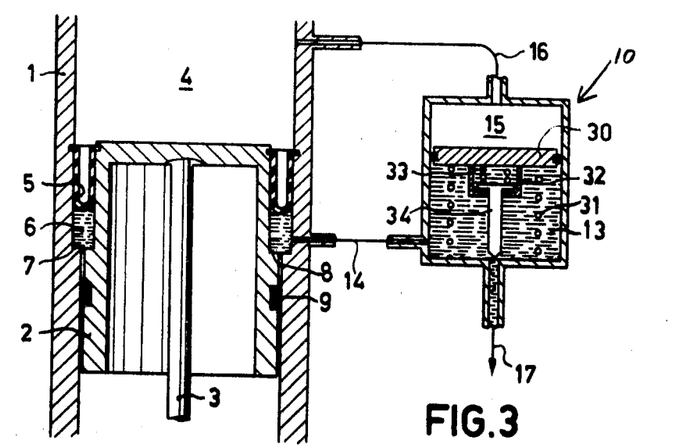

FIG. 2 shows a device which in outline entirely corresponds to the device shown in FIG. 1. The liquid space 6, however, in this device does not communicate, through a communication duct 25, with the working space 4 but with a liquid container 26. The liquid container 26 is sealed at its top by a freely movable piston-like member 27 which with its other side bounds a space 28 which is in open communication with the gas space 4. This means that the liquid in the space 26 will always be under the same pressure as that which prevails in the space 4. When, for example, on starting no or an insufficient amount of liquid is present in the space 6, the diaphragm 12 of the control device 10 will be forced downwards to such an extent that the valve 29 is opened so that liquid from the space 26 is forced to the space 6. It is required in this case that the duct 25 again has a low resistance to flow so that only a small delay exists between the instant which whi,h the valve 29 is opened and the instant at which liquid from the space 26 reaches the space 6. In this device the rolling diaphragm 5 consequently is always supported by liquid which renders this device suitable as such for varying pressures in the gas space 4. FIG. 3 shows a device which again corresponds to the devices shown in the preceding Figures. In this device the control device 10 is larger so that a considerable quantity of liquid is present in the space 13. The space 13 is in open communication with the liquid space 6 through a communication duct 14. The space 13 is separated from the space 15 by a freely movable piston-like member 30, which latter space is in open communication with the gas space 4.

A spring 31 having a flat characteristic engages the piston member 30. As a result of this the pressure and the liquid will always be lower by a given amount than the gas pressure in the spaces 15 and 4, respectively. Guides 32 are connected to the piston-like member 30 for guiding a plate 33 to which the valve stem of a valve 33 is connected.

The operation of this device is as follows:

Liquid is applied to the space 6 by the pumping ring 9. When so much liquid is in the spaces 6 and 13 that the liquid pressure is equal to the gas pressure in the spaces 15 and 4 decreased by a pressure which corresponds to the force exerted by the spring 31 on the piston 30, the valve 34, if more liquid is supplied, is further opened so that the liquid is dissipated from the space 13.

If, by some cause or other an insufficient amount of liquid is present in the spaces 6 and 13, the gas pressure in the space 15 will ensure that the piston 30 is forced downwards. As a result of this, first of all the valve 34 will be forced on its seating and furthermore liquid will be forced from the space 13 to the space 6 so that the rolling diaphragm remains readily supported by liquid.

Figure 4:
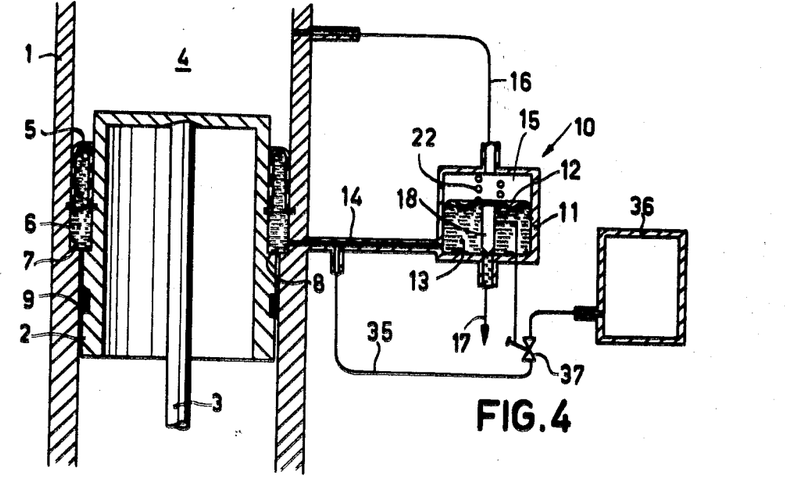
FIGS. 4 and 5 diagrammatically show cross-sectional views of two embodiments of devices which comprise rolling diaphragm seals supported by liquid, the rolling diaphragms facing the gas space with their convex sides.

FIG. 4 shows a device in which the rolling diaphragm 5 faces the gas space 6 with its convex side. This means that for supporting and holding the rolling diaphragm tautly stretched in the correct manner, the pressure of the liquid in the space 6 will always have to be higher by a certain amount than the pressure of the gas in the space 4. This is reached by arranging the spring 22 in the control device 10 over the diaphragm 12. When the pressure of the liquid in the space 6 becomes too high, that is to say when the pressure differential across the rolling diaphragm exceeds a given value, the valve 18 will be lifted, so that oil can be conducted away from the space 6 through the outlet 17. The liquid space 6 communicates, through a duct 35 having a low resistance to flow, with a container 36 which contains gas or liquid under a pressure which is at least equal to the pressure in the gas space 4 increased by the desired pressure differential across the rolling diaphragm 5. A valve 37, the opening and closing of which is actuated by the movement of the diaphragm 12, is arranged in the duct 35. If by some cause or other an insufficient amount of liquid is present in the space 6, which may occur, for example, in starting the device, the diaphragm 12 will assume such a position that the valve 37 is opened so that medium from the container 36 enters the space below the rolling diaphragm through the duct 35. The rolling diaphragm is further supported by said medium. If no or substantially no pressure variations occur in the space 4, the medium in the container 36 may be a gas. In the alternative case it is desirable to use liquid as a medium. In this manner it is reached again, that at those instants at which the pumping ring 9 supplies an insufficient amount of liquid, or has not yet been capable of supplying a sufficient amount of liquid, supporting medium is obtained from another source. In the device shown in FIG. 4, the supporting medium is temporarily obtained from an additional high-pressure container 36.

Figure 5:
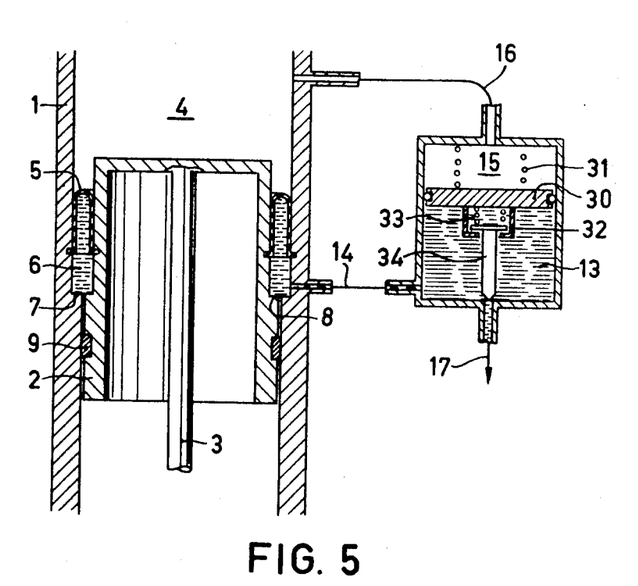

The device shown in FIG. 5 again comprises a rolling diaphragm 5 which faces the gas space 4 with its convex side. This means that for a good support of the rolling diaphragm the liquid pressure in the space 6 must always be higher by a given amount than the gas pressure. This is reached by arranging the spring 31 over the piston 30 so that pressure forces which are directed towards the liquid act upon said piston. The further construction and operation of said device correspond to that of the device shown in FIG. 3.

In those cases in which during the starting period a liquid or a gas is applied below the rolling diaphragm from an additional container, these additional containers must, of course be provided with the required liquid and gas, respectively, during operation. This may be effected by means of a pump or a compressor which is coupled to the shaft of the device.

Figure 6:
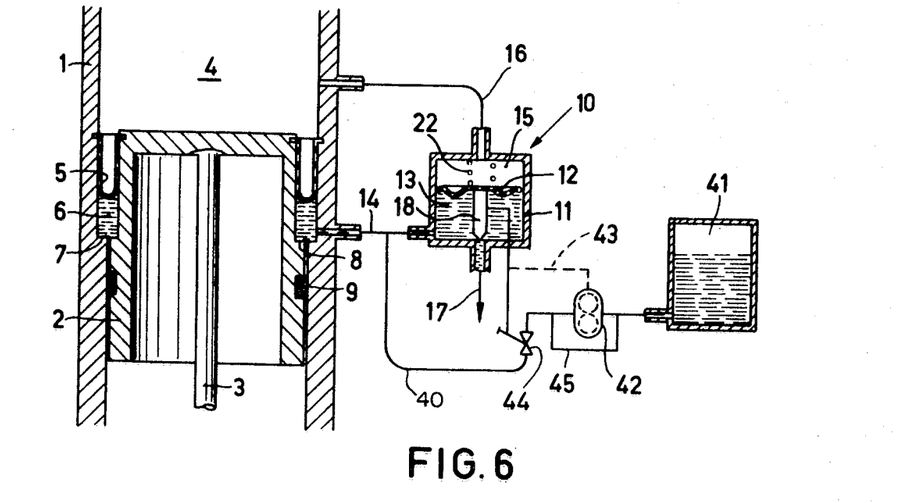
FIG. 6 diagrammatically shows a device comprising a rolling diaphragm seal, in which, when the pressure differential across the rolling diaphragm falls below a given value, liquid is supplied below the rolling diaphragm by means of an additional pump.

FIG. 6 shows a device which in outline corresponds to those of the preceding Figures. In this device the liquid space 6 communicates with a liquid container 41 through a duct 40. In the duct 40 a pump 42 is arranged which transports liquid from the space 41 to the liquid space 6 and can supply more liquid per unit time than the pumping ring 9. The control of the supply of liquid to the space 6 can be effected in two manners. Firstly, the pump 42 may be driven intermittently in that sense, that, dependent upon the position of the diaphragm 12, the control 43 actuates or deactuates the driving. Secondly, the pump 42 may run continuously, a controllable valve 44 being arranged in the duct 40 and, in addition, a circulating duct 45 being arranged across the pump 42. In this device the controllable valve is operated by the control device 43 in accordance with the position of the diaphragm 12. If insufficient liquid is present in the space 6, the deficiency is very rapidly replenished by the pump 42.

Figure 7:
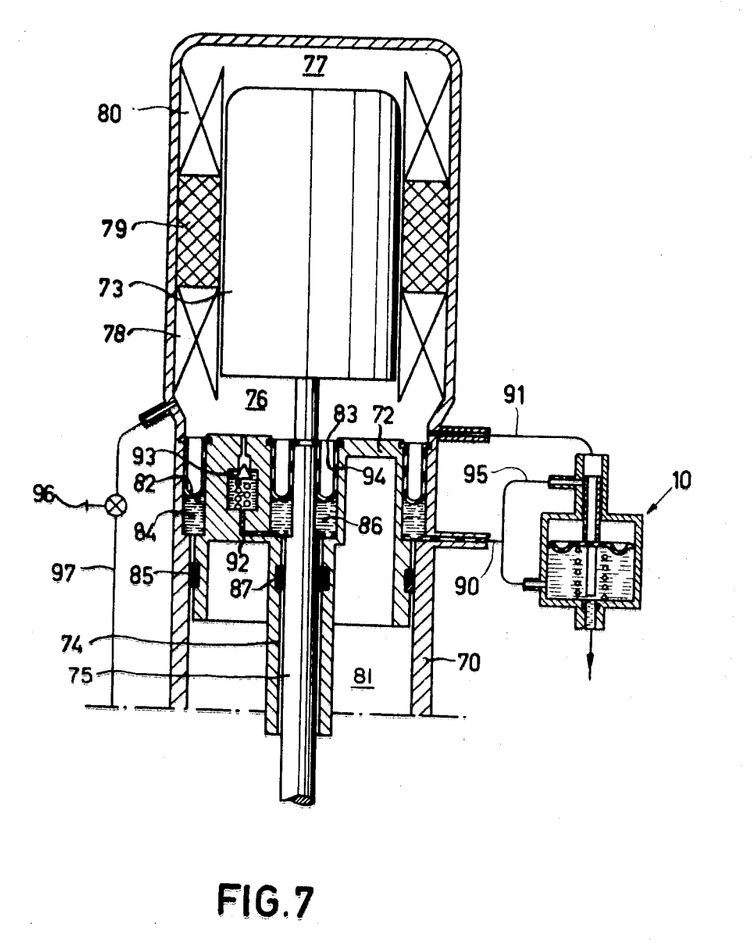
FIGS. 7 and 8 show two embodiments of hot-gas reciprocating engines of the displacer type which are provided with a buffer space below the piston and in which liquid-supporting rolling diaphragm seals are used.

FIG. 7 shows diagrammatically and not to scale a hot-gas reciprocating engine of the displacer type. This engine comprises a cylinder 70 in which a piston 72 and a displacer 73 reciprocate. The piston 72 and the displacer 73 are connected by a piston rod 74, and a displacer rod 75, respectively, to a gear not shown which moves said members with the desired mutual phase. The piston 72 bounds with its upper side a compression space 76 while the displacer 73 bounds with its upper side an expansion space 77. The compression space 76 and the expansion space 77 communicate with one another through a cooler 78, a regenerator 79, and a heater 80. Below the piston 72 there is a buffer space 81 of such a volume that the volume variations in this space produced by the movement of the piston 72 result in substantially no pressure variations. The seal between the piston 72 and the cylinder 70 is formed by a rolling diaphragm 82 and the seal between the piston 72 and the displacer rod 75 is formed by a rolling diaphragm 83. Below the rolling diaphragm 82 there is a liquid space 84 to which liquid is supplied through a pumping ring 85. Below the rolling diaphragm 83 there is a liquid space 86 to which liquid is supplied by a pumping ring 87. The space 84 communicates, through a duct 90 with a control device 10 of the same construction as shown in FIG. 1. This control device further communicates with the compression space 76 through a duct 91. The operation of this control is entirely identical to that shown in FIG. 1 and will not be further described.

The liquid space 86 communicates through a duct 92 which comprises a spring-loaded check valve 93 with the compression space 76. Furthermore, an aperture 94 is provided in the wall of the liquid space 86 through which aperture liquid can be conducted away from the space 86 if the pressure differential across the rolling diaphragm 83 would become too small. If on the contrary the pressure differential across the rolling diaphragm 83 becomes too large, the check valve 93 will be opened so that gas form the compression space 76 can enter the space 86 below the rolling diaphragm.

When the hot-gas reciprocating engine has been stationary for some time, the liquid from the spaces 84 and 86 will have leaked away. In starting the device the valve 96 in the duct 97 will be opened, so that the working space is made to communicate with a space in which the same average pressure prevails as in the working space. Then the desired operating pressure can be adjusted in the working space; the control valve 93 and the valve 96 being opened because no liquid is present in the spaces 84 and 86 so that also gaseous medium is admitted to the spaces 84 and 86 so that during starting, at least at the beginning thereof, the rolling diaphragms 82 and 83 are supported by a gas. However, this may be done readily in this case since, because the working space communicates with another space, no pressure variations will occur during the starting period so that the gas support for the rolling diaphragms will be sufficient.

Figure 8:
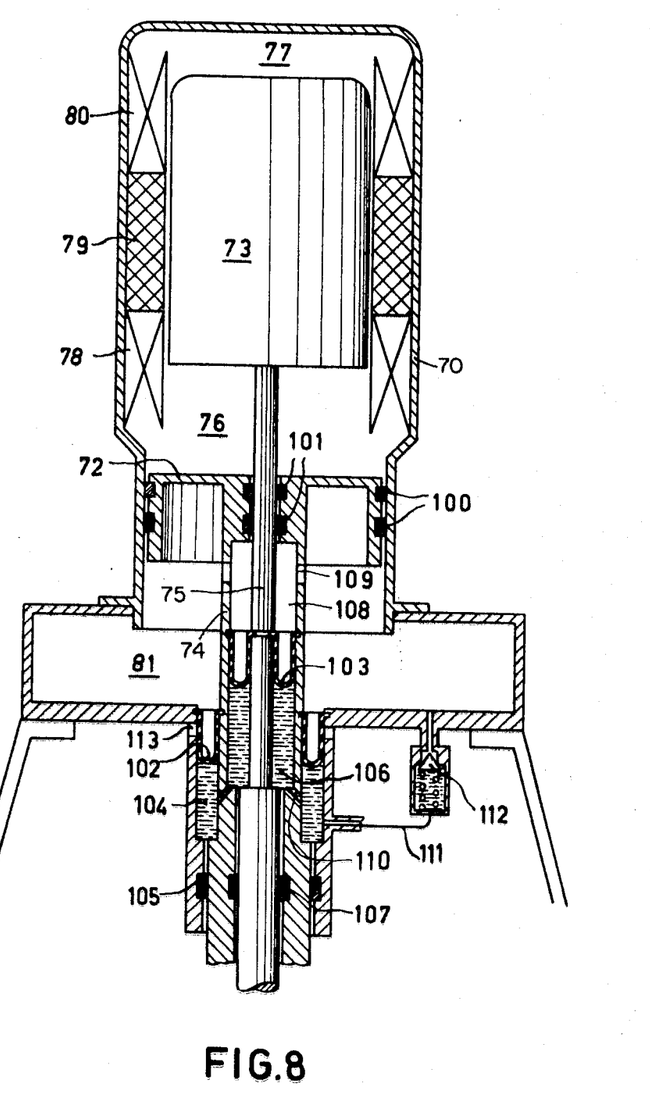

FIG. 8 shows another embodiment of the hot-gas reciprocating engine shown in FIG. 7. In this engine the seal between the piston 72 and the cylinder 70 is formed by the piston rings 100. The seal between the piston 72 and the displacer rod 75 is formed by piston rings 101. The seal between the piston rod 74 and the wall of the buffer space 81 is formed by a rolling diaphragm 102, while the seal between the displacer rod 75 and the piston rod 74 is formed by a rolling diaphragm 103. Below the rolling diaphragm 102 there is a liquid space 104 to which liquid can be supplied by a pumping ring 105. Below the rolling diaphragm 103 there is a liquid space 106 to which liquid can be supplied by a pumping ring 107. Above the rolling diaphragm 102 there is the buffer space 81 while above the rolling diaphragm 103 the space 108 is present which, through an aperture 109, is in open communication with the buffer space 81 so that both above the rolling diaphragm 102 and above the rolling diaphragm 103 no pressure variations will occur. The liquid spaces 104 and 106 are in open communication with one another through an aperture 110, while these two spaces which are in open communication with one another communicate with the buffer space 81 through a duct 111 comprising a spring-loaded check valve 112. The dissipation of liquid from the two liquid spaces 104 and 106 may be effected through an aperture 113 which is opened and closed, respectively, by the rolling diaphragm 102. After the above it will be clear that this hot-gas reciprocating engine also can be started immediately with the desired operating pressure, independent of the fact whether a sufficient amount of liquid is present below the two rolling diaphragms. If an insufficient amount of liquid is present below the rolling diaphragm, the deficiency of supporting medium will be replenished at least temporarily by medium from the buffer space 81 because in the case of too large a pressure differential the check valve 112 is opened and gas from the space 81 can enter the liquid space.

It will be clear that, besides during starting, the measure according to the invention is also userul in the case of disturbances of liquid supply to the liquid spaces occurring during the operation. If fact, in that case the deficiency of liquid will also be replenished by medium, gas or liquid, which is obtained from another source.

Although in the drawings the liquid supply means are always represented by oil-pumping piston rings, it will be clear that instead of these pumping rings also a normal oil pump coupled to the shaft of the device may be used.

What is claimed is:

1. An apparatus operable with gas and liquid fluid medium having two co-axially arranged elements movable relative to each other, comprising a rolling diaphragm seal arranged between said elements, said seal separating a gas space and a liquid space during normal operation, pumping means for supplying liquid to said liquid space, a control device for conducting away liquid from said liquid space when the pressure differential across said rolling diaphragm seal falls below a minimum value or exceeds a maximum value, said control device being provided with a chamber having a medium therein, a conduit for connecting said liquid space with said chamber, and means being provided for bringing medium from said chamber into said liquid space when the pressure differential across said rolling diaphragm seal exceeds a maximum value or falls below a minimum value, the apparatus further comprising a container for at least one of said fluid mediums under pressure which is at least equal to the pressure in said gas space, said conduit being provided with means connecting said liquid space to said container, the pressure in said container being increased by the minimum permissible differential pressure across said rolling diaphragm seal.

2. In an apparatus having a housing including a cylindrical bore, a piston axially movable within the bore and means for moving said piston, a rolling diaphragm seal secured between the piston and the bore defining and separating within said bore principal gas and liquid spaces respectively for containing gas and liquid fluid mediums, the seal having a concave side and an opposite convex side, a first of the sides facing the principal gas space and the second of the sides facing the principal liquid space with a pressure differential maintained across said seal and the liquid supporting the seal by contact with said second side during normal operation of the apparatus, some liquid leaking away from said principal liquid space during non-operation of the apparatus, and pumping means driven by movement of said piston for supplying liquid to said principal liquid space during normal operation of the apparatus, the improvement in combination therewith of control means for maintaining a selected pressure differential across said seal, comprising a chamber separate from said principal gas and liquid spaces and containing a fluid medium therein under pressure at least as great as pressure in said principal gas space, auxiliary duct means for communicating said fluid medium to said principal liquid space, and valve means associated with said auxiliary duct means responsive to an excessive pressure differential across said seal for correspondingly flowing said medium from said chamber to said principal liquid space when a quantity of liquid in said space has leaked away with a resulting excessive pressure differential across said seal.

3. Apparatus according to claim 2 wherein said separate chamber is a container and said medium therein is a liquid.

4. Apparatus according to claim 2 wherein said piston and cylinder bore are components of a hot gas engine, the piston being the engines compression piston and said principal gas space being the engine's compression space.

5. In an apparatus having a housing including a cylindrical bore, a piston axially movable within the bore and means for moving said piston, a rolling diaphragm seal secured between the piston and the bore and defining and separating within said bore principal gas and liquid spaces respectively for containing gas and liquid fluid mediums, the seal having a concave side and an opposite convex side, a first of the sides facing the principal gas space and the second of the sides facing the principal liquid space with a pressure differential maintained across said seal and the liquid supporting the seal by contact with said second side during normal operation of the apparatus, some liquid leaking away from said principal liquid space during non-operation of the apparatus, and pumping means driven by movement of said piston for supplying liquid to said principal liquid space during normal operation of the apparatus, a control device for maintaining a selected pressure differential across said seal comprising a chamber separate from said principal gas and liquid spaces with a movable partition therein separating secondary gas and liquid spaces respectively for containing gas and liquid and in communication with said principal gas and liquid spaces, this device being responsive to excessive pressure differential across said seal, and having means for correspondingly flowing to said principal liquid space only liquid from the secondary liquid space.

6. In an apparatus having a housing including a cylindrical bore, a piston axially movable within the bore and means for moving said piston, a rolling diaphragm seal secured between the piston and the bore and defining and separating within said bore principal gas and liquid spaces respectively for containing gas and liquid, the seal having a concave side and an opposite convex side, a first of the sides facing the principal gas space and the second of the sides facing the principal liquid space with a pressure differential maintained across said seal and the liquid supporting the seal by contact with the second side during normal operation of the apparatus, some liquid leaking away from said principal liquid space during non-operation of the apparatus, and pumping means driven by movement of said piston for supplying liquid to said principal liquid space during normal operation of the apparatus, a control device for maintaining a selected pressure differential across said seal comprising a container separate from said principal gas and liquid spaces, a movable partition in the container separating secondary gas and liquid spaces respectively with gas and liquid therein and in communication with said principal gas and liquid spaces, valve means in said container responsive to excessive pressure in said principal liquid space for permitting liquid flow therefrom to said secondary liquid space, a further supply chamber having a fluid medium therein and communicating with said principal gas and liquid spaces, and means responsive to an excessive pressure in the principal gas space for permitting said fluid medium to flow from said further chamber to said principal liquid space, the pressure in said further chamber being at least as great as the principal gas and liquid space pressures.

7. In an apparatus operable with a separate container of gas, the apparatus having a housing including a cylindrical bore, a piston axially movable within the bore and means for moving said piston, a rolling diaphragm seal secured between the piston and the bore and defining and separating within said bore principal gas and liquid spaces respectively for containing gas and liquid fluid mediums, the seal having a concave side and an opposite convex side, a first of the sides facing the principal gas space and the second of the sides facing the principal liquid space with a pressure differential maintained across said seal and the liquid supporting the seal by contact with the second side during normal operation of the apparatus, some liquid leaking away from said principal liquid space during non-operation of the apparatus, and pumping means driven by movement of said piston for supplying liquid to said principal liquid space during normal operation of the apparatus, a control device for maintaining a selected pressure differential across said seal, the device comprising a chamber with a movable partition therein defining separate gas and liquid spaces respectively in communication with said principal gas and liquid spaces, the partition being responsive to an excessive pressure differential across said seal for correspondingly flowing gas from said container to said principal liquid space when the quantity of liquid in said space is insufficient to maintain said selected pressure differential.

* * * * *